United States Patent
Kaluskar et al.

(10) Patent No.: US 6,985,904 B1
(45) Date of Patent: Jan. 10, 2006

(54) SYSTEMS AND METHODS FOR SHARING OF EXECUTION PLANS FOR SIMILAR DATABASE STATEMENTS

(75) Inventors: Sanjay Kaluskar, Mountain View, CA (US); Namit Jain, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 326 days.

(21) Appl. No.: 10/086,277

(22) Filed: Feb. 28, 2002

(51) Int. Cl.
G06F 17/30 (2006.01)

(52) U.S. Cl. .............................. 707/101; 707/2; 707/3; 707/10; 707/102

(58) Field of Classification Search .................... 707/2, 707/3, 6, 10, 100, 102, 104, 101; 717/143
See application file for complete search history.

(56) References Cited

U.S. PATENT DOCUMENTS

| | | | |
|---|---|---|---|
| 5,404,510 A | 4/1995 | Smith et al. | |
| 5,412,804 A | 5/1995 | Krishna | |
| 5,495,608 A | 2/1996 | Antoshenkov | |
| 5,615,359 A * | 3/1997 | Yung | 707/10 |
| 5,664,172 A | 9/1997 | Antoshenkov | |
| 5,734,884 A * | 3/1998 | Eberhard et al. | 707/2 |
| 5,758,144 A * | 5/1998 | Eberhard et al. | 707/2 |
| 5,761,654 A * | 6/1998 | Tow | 707/2 |
| 5,802,521 A | 9/1998 | Ziauddin et al. | |
| 5,802,523 A | 9/1998 | Jasuja et al. | |
| 5,819,251 A | 10/1998 | Kremer et al. | |
| 5,822,748 A | 10/1998 | Cohen et al. | |
| 5,857,180 A | 1/1999 | Hallmark et al. | |
| 5,875,334 A * | 2/1999 | Chow et al. | 717/141 |
| 5,892,945 A | 4/1999 | Mirchandaney et al. | |
| 5,899,986 A | 5/1999 | Ziauddin | |
| 5,899,993 A | 5/1999 | Jenkins, Jr. | |
| 5,903,888 A | 5/1999 | Cohen et al. | |
| 5,907,844 A | 5/1999 | Guay et al. | |
| 5,956,705 A | 9/1999 | Stevens et al. | |
| 5,963,742 A * | 10/1999 | Williams | 717/143 |
| 5,974,408 A | 10/1999 | Cohen et al. | |
| 5,987,455 A | 11/1999 | Cochrane et al. | |
| 6,003,022 A * | 12/1999 | Eberhard et al. | 707/2 |
| 6,014,656 A | 1/2000 | Hallmark et al. | |
| 6,026,391 A | 2/2000 | Osborn et al. | |
| 6,029,163 A | 2/2000 | Ziauddin | |
| 6,144,957 A | 11/2000 | Cohen et al. | |
| 6,219,660 B1 | 4/2001 | Haderle et al. | |
| 6,269,373 B1 * | 7/2001 | Apte et al. | 707/10 |
| 6,351,742 B1 | 2/2002 | Agarwal et al. | |

(Continued)

OTHER PUBLICATIONS

Leverenz, Lefty et al., Oracle8 Server Concepts, 1997, pp. 13-1 to 13-19 and 19-1 to 19-68.

(Continued)

*Primary Examiner*—Jean M. Corrielus
(74) *Attorney, Agent, or Firm*—Bingham McCutchen LLP

(57) ABSTRACT

A database statement, such as a SQL text, reuses the execution plan compiled for a similar SQL text found in memory if the value of a system parameter is configured for cursor sharing among optimally shareable SQL texts and the SQL text is optimally shareable with the similar SQL text found in memory. Reuse also occurs if the value of a system parameter is configured for cursor sharing among all shareable SQL texts and the SQL text is suboptimally or optimally shareable with the similar SQL text found in memory. For SQL text that is non-shareable with a similar SQL text found in memory, no execution plan sharing takes place.

60 Claims, 7 Drawing Sheets

U.S. PATENT DOCUMENTS

| | | | |
|---|---|---|---|
| 6,356,887 | B1 | 3/2002 | Berenson et al. |
| 6,370,522 | B1 | 4/2002 | Agarwal et al. |
| 6,370,619 | B1 | 4/2002 | Ho et al. |
| 6,374,257 | B1 | 4/2002 | Guay et al. |
| 6,401,083 | B1 | 6/2002 | Agarwal et al. |
| 6,421,662 | B1 | 7/2002 | Karten |
| 6,439,783 | B1 | 8/2002 | Antoshenkov |
| 6,457,007 | B1 * | 9/2002 | Kikuchi et al. ............... 707/10 |
| 6,470,423 | B1 | 10/2002 | Ho et al. |
| 6,505,227 | B1 | 1/2003 | Mirchandaney et al. |
| 6,546,394 | B1 | 4/2003 | Chong et al. |
| 6,581,055 | B1 | 6/2003 | Ziauddin et al. |
| 6,598,041 | B1 * | 7/2003 | Bernal et al. .................. 707/3 |
| 6,606,627 | B1 | 8/2003 | Guthrie et al. |
| 6,615,206 | B1 | 9/2003 | Jakobsson et al. |
| 6,643,637 | B2 * | 11/2003 | Chen et al. ..................... 707/2 |
| 6,665,678 | B2 * | 12/2003 | Ching Chen et al. ....... 707/100 |
| 6,694,305 | B2 * | 2/2004 | Bernal et al. .................. 707/2 |
| 6,721,731 | B2 * | 4/2004 | Cornwell et al. .............. 707/3 |
| 2003/0055813 | A1 | 3/2003 | Chaudhuri et al. |
| 2003/0120682 | A1 | 6/2003 | Bestgen et al. |
| 2003/0236780 | A1 * | 12/2003 | Saha et al. ..................... 707/3 |

OTHER PUBLICATIONS

Batory, Don, et al., "The Design and Implementation of Hierarchical Software Systems with Reusable Components," ACM Transactions on Software Engineering and Methodology, (Oct. 1992), pp. 355-398, vol. 1, No. 4.

Graefe, Goetz, "Query Evaluation Techniques for Large Databases," ACM Computing Surveys, (Jun. 1993), pp. 73-170, vol. 25, No. 2.

Hindmarsh, Jon, et al., "Fragmented Interaction: Establishing mutual orientation in virtual environments," Proceedings of the 1998 ACM conference on Computer supported cooperative work, (Nov. 1998), pp. 217-226.

Michael, Maged M., "High Performance Dynamic Lock-Free Hash Tables and List-Based Sets," Proceedings of the fourteenth annual ACM symposium on Parallel algorithms and architectures (Aug. 2002), pp. 73-82.

Michael, Maged M., "Safe Memory Reclamation for Dynamic Lock-Free Objects Using Atomic Reads and Writes," Proceedings of the twenty-first annual symposium on Principles of distributed computing (Jul. 2002), pp. 21-30.

Ramdundy, Devina, et al., "Exploring the design space for notification servers," Proceedings of the 1998 ACM conference on Computer supported cooperative work, (1998), pp. 227-236.

Viera, Humberto, et al., "XVerter: Querying XML Data with OR-DBMS," Proceedings of the fifth ACM international workshop on Web Information and data management, (Nov. 2003), pp. 37-44.

Zhu, Yali, et al., "Dynamic Plan Migration for Continuous Queries Over Data Streams," SIGMOD Conference (2004), pp. 431-442.

Anonymous, "Oracle 8i Designing and Tuning for Performance," Release 2 (8.1.6), (Dec. 1999), Chapter 19, pp. 12-18; http://download-west.oracle.com/docs/cd/A81042_01DOC/server.816/a76992/ch19_mem.htm and Chapter 127, pp. 26, http://downloat_west.oracle.com/docs/cd/A81042_01/DOC/server.816/a76961/ch127.htm.

* cited by examiner

TABLE 1

| SIMILAR SQL TEXT CATEGORY | PARAMETER VALUE | RESULT | SAMPLE STATEMENT PAIR |
|---|---|---|---|
| OPTIMALLY SHAREABLE | EXACT | COMPILE | 1. INSERT INTO EMP_T VALUES (543, JOE, 32) |
|  | SIMILAR | SHARE | 2. INSERT INTO EMP_T VALUES (297, SALLY, 45) |
|  | FORCE | SHARE |  |
| SUB-OPTIMALLY SHAREABLE | EXACT | COMPILE | 3. SELECT * FROM EMP_T, DEPT_T WHERE (EMP_T.EMPLOYEE_ID<100) AND (EMP_T.ENAME=DEPT_T.ENAME). |
|  | SIMILAR | COMPILE | 4. SELECT * FROM EMP_T, DEPT_T WHERE (EMP_T.EMPLOYEE_ID<500) AND (EMP_T.ENAME=DEPT_T.ENAME). |
|  | FORCE | SHARE |  |
| NON-SHAREABLE | EXACT | COMPILE | 5. SELECT NAME, DOB FROM EMP_T ORDER BY 2 |
|  | SIMILAR | COMPILE | 6. SELECT NAME, DOB FROM EMP_T ORDER BY 1 |
|  | FORCE | COMPILE |  |

FIGURE 3

SYSTEMS AND METHODS FOR SHARING OF EXECUTION PLANS FOR SIMILAR DATABASE STATEMENTS

BACKGROUND

FIELD OF THE INVENTION

This application relates generally to the sharing of data structures, and more particularly relates to systems and methods for sharing of execution plans for similar database statements.

In modern relational database management systems (RDBMS), the overhead associated with processing client requests can be significant. Cache and buffer overflow, I/O bottlenecks, wasted CPU cycle time, shared memory latch contention, network throughput, and other performance side effects often result from poor planning and untested design.

To avoid these and other by-products of a poorly designed system, a client/server DBMS architecture could benefit greatly from a streamlined database statement processing system. In a typical two-tier DBMS architecture, a client issues a database statement (hereinafter illustratively referred to as a "SQL statement") to a process running on the database server through a proprietary or open-system call level interface (CLI). The server expends a great deal of its run-time resources in parsing the request, creating an execution tree, semantically analyzing the statement, and determining an optimal execution plan. These steps together constitute the compilation, or "hard parse," steps needed to store and create a cursor in cache memory before the server can effectively carry out a client request or return a result set.

It would be highly desirable to implement a process and system for conserving system resources and reducing the overhead/expense of processing SQL statements. Conserving system resources means avoiding, where possible, the redundant processing of client SQL statements. While a DBA can accomplish some performance enhancement via run-time parameter adjustment, often the parameters available to the DBA are not tailored specifically to execution plan reuse.

The systems and methods for sharing of execution plans for similar SQL statements, according to embodiments of the invention, minimize or eliminate the inherent limitations and drawbacks of current SQL processing techniques by permitting a SQL statement issued from a client to reuse a cursor pre-compiled for a similar SQL statement.

SUMMARY

In one embodiment, the systems and methods for sharing of execution plans comprises the following system components: a search engine, a cursor sharing monitor, and a compiler. The search engine searches the shared memory pool for a pre-existing cursor built from similar SQL text that matches the text of the issued SQL statement. The cursor sharing monitor invokes and monitors execution plan reuse if a match is found, or if a match is not found and the previously mentioned configurable system parameter is configured to permit plan reuse. The compiler is responsible for performing such "hard parse" steps (the details of which depend largely upon the particular DBMS implementation) in the case of no match found or the value of the configurable system parameter disallows reuse.

The systems and methods for sharing of execution plans for similar SQL statements reap many benefits, including: enhanced SQL processing performance without costly code revision, a decrease in the number of hard parse compilations that would otherwise be needed, and reduced CPU cycle time and latch contention, to name a few.

Further details of aspects, objects, and advantages of the invention are described in the detailed description, drawings, and claims.

BRIEF DESCRIPTION OF THE DRAWINGS

FIG. 3 is a table representing various SQL statements with different combinations and positions of literals, showing varying levels of acceptability for sharing cursors for these statements according to one embodiment.

DETAILED DESCRIPTION OF THE PREFERRED EMBODIMENTS

The first time a SQL statement is processed by a server, it is usually compiled. Compilation is a multi-stage process beginning with a parse and ending with an execution plan as further described below. The compilation process is often referred to as a "hard parse" due to the sheer amount of work (i.e., in the form of function calls, routine invocations, memory accesses, etc.) involved to accomplish the task.

Figure 1:
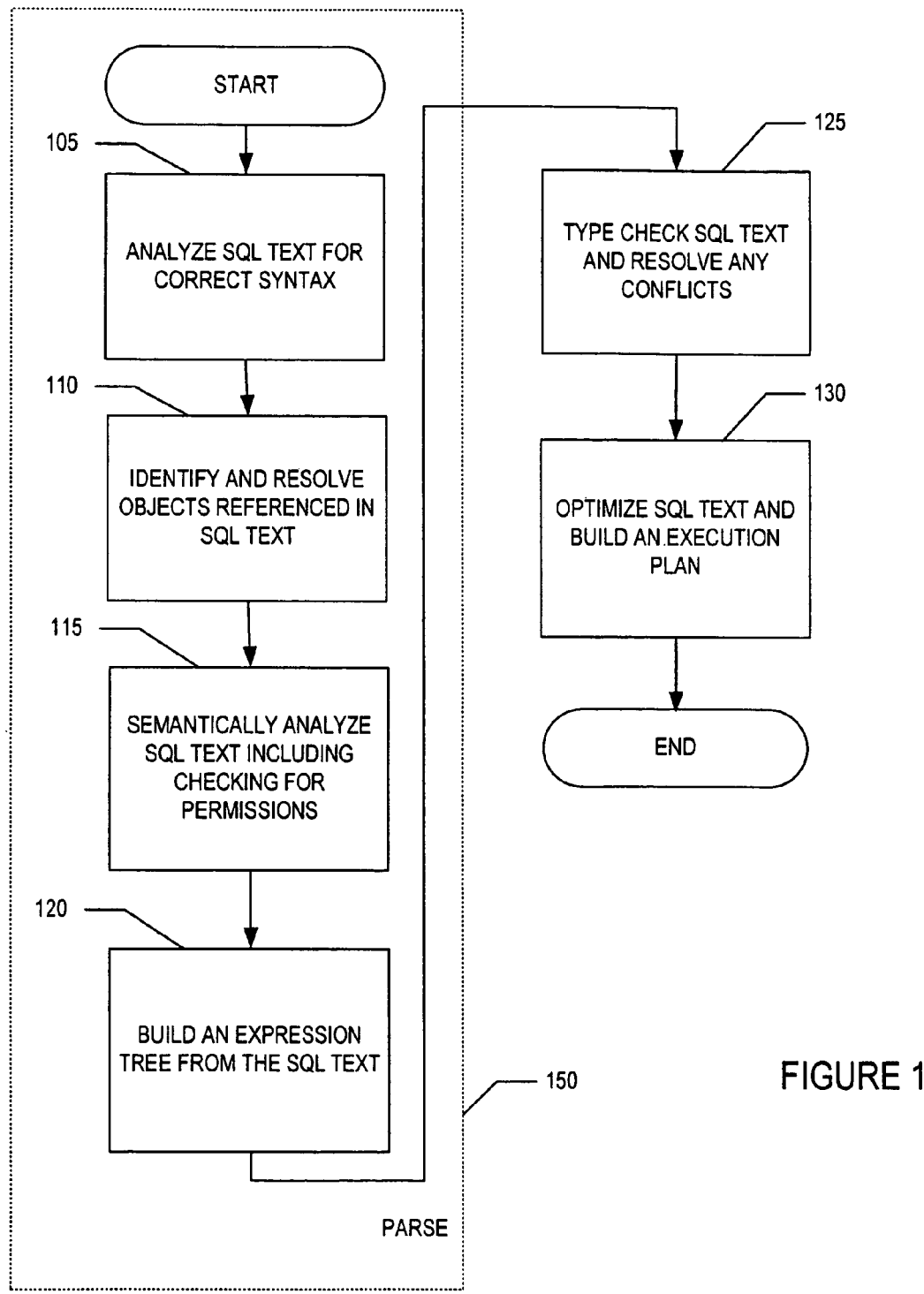
FIG. 1 is a flow diagram representing an example process for compiling a cursor according to one embodiment.

FIG. 1 is a flow diagram illustrating the basic SQL statement compilation steps according to an embodiment. In this embodiment, the database statement is a SQL statement compilation begins with parse phase 150. The parse phase is so named because the SQL statement is analyzed and parsed clause by clause into its constituent components creating an expression tree (sometimes called a parse tree). The expression tree is effectively the SQL statement mapped to a new data structure and is eventually what gets traversed later during execution. The parse phase can consist of steps 105–120, depending on the SQL implementation.

The parse phase involves syntactical analysis, step 105, where the statement is analyzed for correct syntax, followed by step 110, where among other things, a determination is made whether the referenced objects exist. In step 115, user permissions are analyzed by the semantic analyzer to determine if the client holds access privileges to the specific objects referenced in the SQL text. Finally, the parse phase concludes by developing an expression tree for the SQL text in step 120.

The type checking stage 125 engages data type resolution between a client process and a server process, which verifies and corrects data type incompatibilities that can exist, for example, in a heterogeneous enterprise client/server network. For example, a user process (client) running on Windows NT against an Oracle Corporation ("Oracle")

database running on MVS (multiple virtual storage) would require data type resolution between ASCII and EBCDIC.

An objective of SQL statement compilation is the development of an execution plan in step 130. The execution plan is the result of optimization by an optimizer running as a separate process on the server. The optimizer accepts a parsed and analyzed statement from parse phase 150 and figures out the best method of execution for the particular statement based on a number of criteria, including: statistical information gathered during syntactical analysis (step 110) and semantic analysis (step 115); selectivity of the statement if the statement happens to be a DML (data manipulation language) statement; and optimization methodologies, such as cost-based optimization (CBO) and/or activity based optimization (ABO). The result of a hard parse is a memory-resident data structure, which dictates to the server, by way of the execution plan, the best method for carrying out the database statement request. A cursor is one example of such a data structure that is essentially a handle to a memory location where the details and results of a parsed and optimized database statement reside. The cursor comprises, among other things, a compiled SQL statement with its associated execution plan. A cursor in this context resides in the server's shared memory pool and as such, it must be distinguished from the use of the term cursor from other data processing contexts, such as client-side procedural language originated cursors used to aid data table processing.

The SQL statement compilation process described above (and the cursor resultant therefrom) are both non-optimal in many respects. From an efficiency standpoint, a hard parse is slow and cumbersome, often causing noticeable execution delays for the application end-user. Further, economies such as would be derived from a simple check for a pre-existing cursor that could be reused or shared are unrealized. For example, a simple scan of the shared memory pool before initiating a hard parse can uncover the existence of a pre-built cursor suitable for reuse by the existing SQL statement held in the shared memory pool.

Figure 2:
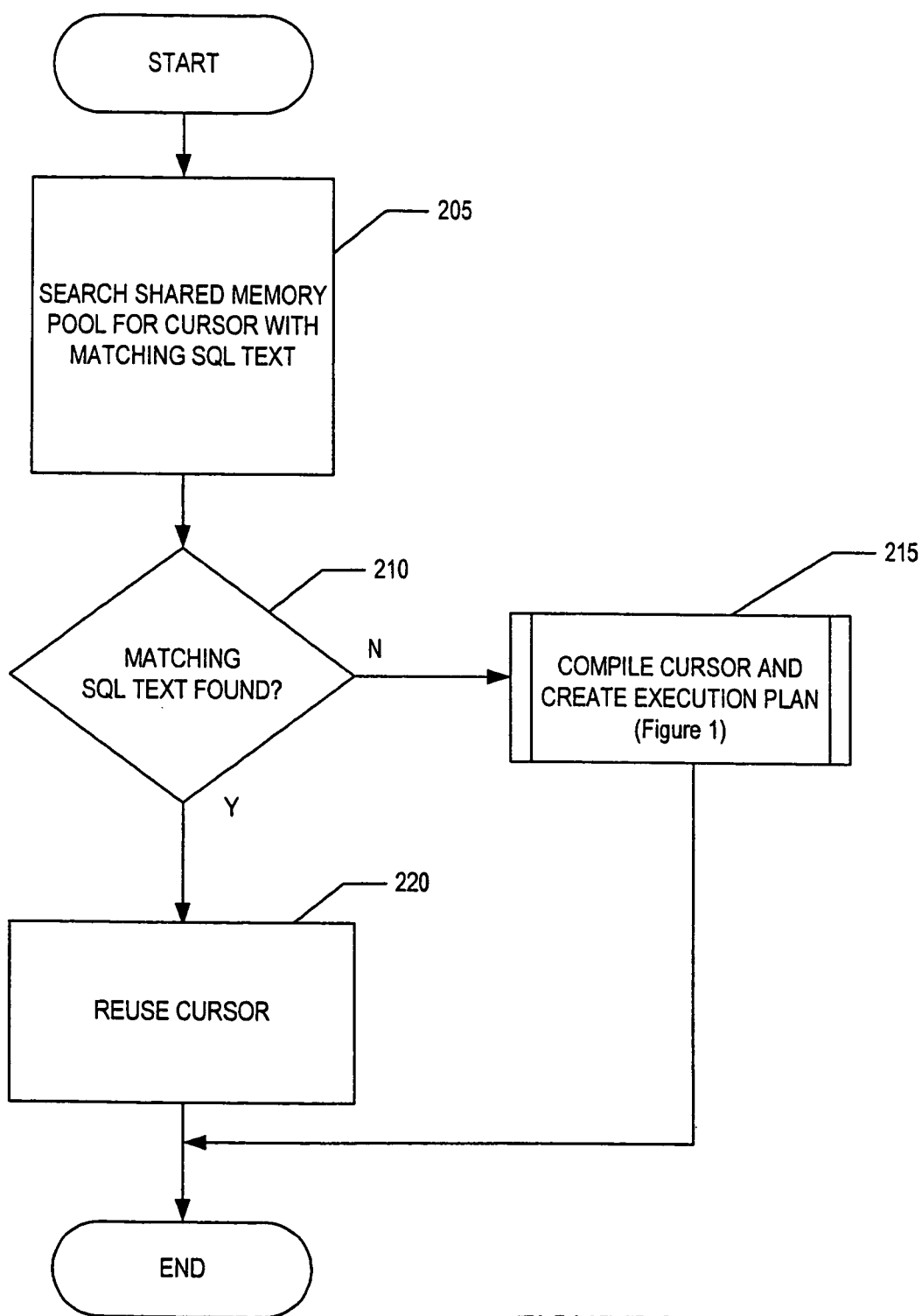
FIG. 2 is a flow diagram representing an example process for the soft parse methodology for avoiding compilation according to one embodiment.

The systems and methods for sharing of execution plans for similar SQL statements overcome the disadvantages discussed above by reusing the execution plan of an existing cursor in those situations where a client issues a SQL statement similar to another SQL statement previously compiled. This can significantly reduce the expense of compilation involved in processing SQL statements. Expense of compilation can be measured in terms of expended CPU cycles and cache hits, among other things. Therefore, the systems and methods for sharing of execution plans for similar SQL statements have as one goal the minimization of these and other measures. FIG. 2 modifies the hard parsing methodology of FIG. 1 to incorporate a search stage. Step 205 computes a hash value to determine if a matching SQL statement exists in the shared memory pool. If a match is found, step 210, then the performance penalty of initiating a hard parse can be avoided altogether—the existing plan compiled for the matching SQL statement will be reused for the instant SQL statement (step 220). If a match is not found, then compilation proceeds as in FIG. 1 (step 215), beginning with parse phase 150 and ending with execution plan creation 130. In the case of no match, no savings can be achieved. This process of searching for a SQL statement match is called a soft parse. In general, a soft parse is preferred over a hard parse because a soft parse consumes far fewer resources.

One technique for avoiding hard parse compilation of a SQL statement is to share or reuse cursors for identical SQL statements. In this approach, the matching step 210 of FIG. 2 is accomplished if an existing cursor corresponds to a first SQL statement that exactly matches the SQL statement presently being processed. If so, a soft parse is performed, and then the execution plan of the existing cursor is shared/re-used for the current SQL statement to avoid performing a hard parse compilation.

According to one embodiment of the invention, even if two SQL statement do not exactly match, a soft parse can often be performed if the two SQL statements differ by only one or more literals (e.g., constants). Thus, two statements are considered "matching" in this embodiment at step 210 if no more than the values of one or more literals in the SQL statements are different. One approach to identifying multiple SQL statements that only differ by literal values is to replace each literal within a SQL statement with a "placeholder" element. If the multiple similar SQL statements differ by only one or more literals, then after the literals are replaced with common placeholder elements, each transformed SQL statement should match. Any suitable element can be employed as a placeholder. For example, in one embodiment, bind variables are used as placeholder elements.

To illustrate, consider a first SQL statement that had previously been hard-parsed, in which the WHERE clause of the statement includes the constant "100" as follows:
SELECT*FROM EMP_T WHERE EMPLOYEE_ID=100

This statement can be transformed by replacing the literal "100" with the bind variable ":X":
SELECT*FROM EMP_T WHERE EMPLOYEE_ID=:X Now assume that a second SQL statement is subsequently issued as follows:
SELECT*FROM EMP_T WHERE EMPLOYEE_ID=200

It can be seen that this second SQL statement differs from the first SQL statement only by the value of the literal in the WHERE clause. This second SQL statement can be transformed by replacing the literal with the same bind variable ":X". The following shows the transformed version of the second SQL statement:
SELECT*FROM EMP_T WHERE EMPLOYEE_ID=:X A search of existing cursors will readily detect that the transformed version of the second SQL statement exactly matches the transformed SQL statement corresponding to the cursor for the first SQL statement. Only a soft parse is needed in this example to share/re-use the existing cursor that has already been created for the first SQL statement, thereby avoiding the expense of performing a hard parse compilation.

During compilation, the optimizer tailors the execution plan of a SQL statement based in part on the literal values (constants) input by the user or the application when the statement was issued or written. A compiled SQL statement (in the form of a cursor) is specific to that statement, right down to the constants. In other words, what constitutes an optimal plan for one statement may not necessarily yield optimal execution for another statement that differs only by a constant. In developing an appropriate execution plan, the specific position of the literal within the statement may matter, as may the specific value of the literal vis-à-vis other object information, such as the number of rows in a table or view. As such, it is possible that cursor sharing is not desirable or usable for all types of SQL statements. In effect, certain types of SQL statements are more amenable to cursor sharing than other types of SQL statements. For example, there may exist certain types of SQL statements that should not be used for cursor sharing unless the statements are identically matched, while there may also exist other types of SQL statements that can be used for cursor sharing even if the statements are not exactly identical (e.g., literal-replacement is used to find a match).

TABLE 1 (FIG. 3) sets forth examples of various SQL statements with different combinations and positions of literals, showing varying levels of acceptability for sharing cursors for these statements according to one embodiment of the invention. Consider the first sample statement pair shown in TABLE 1 (i.e., statements 1 and 2). Each of these SQL statements insert a set of values ("543, JOE, 32" and "297, SALLY, 45") into a row of the same table ("EMP_T"). Thus, both statements are identical, except for the value of the literals in these statements. Based upon the particular structure and composition of these statements, it is likely an optimizer would produce the same or very similar execution plan for both statements.

Consider the second sample statement pair shown in TABLE 1 (statements 3 and 4). Here, even though the two statements differ only by their literal values, an optimizer may build an execution plan for these two similar statements differently, depending upon various factors, including: the different join algorithms available, the existence of an index for one or more columns in either the EMP_T or DEPT_T tables, and access to data distribution statistics on the EMPLOYEE_ID column. For example, the optimizer may prepare an execution plan for the first of these statements that calls for a nested loop join, while the second statement may call for a hash join. It may be difficult or impossible by examining the statements' syntax alone to identify whether their plans will differ. It is the factors mentioned above, and not merely the syntactical concurrence of any two statements, that controls similarity.

Thus, while the execution plan prepared for the first statement may still be usable by the second statement to produce a valid result, it is also likely that the execution plan prepared for the first statement will not be properly optimized for the second statement and will therefore be overly expensive to execute. For this reason, statements 3 and 4 of TABLE 1 can be qualified as "suboptimally" shareable statements because although they only differ by a literal value, they likely have very different execution plans. Similarly, for ease of illustration, statements 1 and 2 of TABLE 1 can be qualified as "optimally" shareable because they are likely to have the same or very similar execution plans, without significant sacrifice to performance when sharing cursors because of the nature of the "INSERT INTO" clause and the placement of literals therein.

Thus, the difference between a statement which can and ought to share a cursor with another similar statement, and a statement which can but may not want to share a cursor with another similar statement is now apparent. For the first statement pair of TABLE 1 (statements 1 and 2), sharing a cursor will not significantly impact performance. However, for the second statement pair of TABLE 1 (statements 3 and 4), sharing a cursor may affect performance depending on whether the respective execution plans for the two statements differ. If statements 3 and 4 of TABLE 1 do in fact have identical optimal plans, then sharing cursors is desirable. If the two statements do not have identical optimal plans, then an application or user may want to avoid cursor reuse.

The systems and methods for sharing of execution plans provide a solution that allows for such control by the application designer or user as further explained below. In one embodiment, the systems and methods for sharing of execution plans are implemented as a dynamic parameter accepting one of three values: FORCE, SIMILAR, and EXACT. Consider a parameter called cursor_sharing, which stores the value. The following paragraphs explain the meaning of these three parameter values.

EXACT cursor_sharing=EXACT is the default setting. For cursor_sharing set to EXACT, the system must find an exact match between the instant SQL text and a cursor in the shared memory pool in order for a cursor to be reused. An exact match means literal for literal; thus, only textually identical statements will invoke plan sharing. As such, this setting conforms to the behavior expounded above wherein the first pair of SQL statements of TABLE 1 would not share a cursor because they are not identical, literal for literal. The benefits of the systems and methods for sharing of execution plans are not realized with this parameter setting.

Similar

For cursor_sharing set to SIMILAR, only similar statements that are optimally shareable will share an execution plan. For example, with this setting of the cursor_sharing parameter the first sample statement pair of TABLE 1 above would share a cursor, but the second sample statement pair would not.

Force

For cursor_sharing set to the value FORCE, execution plans will be shared among suboptimally shareable statements as well as among optimally shareable statements. Forcing plan sharing among suboptimally shareable statements may cause a potential hit to statement execution performance because FORCE trumps what would have been the optimal execution plan derived by the optimizer for that statement. Hence, cursor_sharing should only be set to FORCE when the benefits of cursor sharing are believed or known by the user or application designer to outweigh the consequences of suboptimal statement execution.

Cursor sharing using the cursor_sharing embodiment can be effected in at least three ways according to an embodiment: using a command-line parameter to override the current setting, a server initialization parameter issued at system start-up, or a session-based parameter having the duration of only a single session. For example, the syntax of the ALTER SYSTEM and ALTER SESSION commands (e.g., in the Oracle 9i database system available from Oracle Corporation of Redwood Shores, Calif.) can be modified to allow a cursor sharing parameter to be set as follows:

ALTER SYSTEM SET cursor_sharing={FORCE|SIMILAR|EXACT}

ALTER SESSION SET cursor_sharing={FORCE|SIMILAR|EXACT}

Also, information about the current setting of the cursor sharing parameter can be obtained by consulting one or more metadata views as is well known in the art and easily accomplished via a simple SQL run-time query against the appropriate view. Bind variable metadata can be obtained in a similar manner. For instance, a DBA who wishes to access information about internal bind variables (introduced below) can issue a SQL query against the Oracle system metadata view V$SQL_BIND_DATA using the following syntax:

SELECT*FROM V$SQL_BIND_DATA
WHERE BITAND(SHARED_FLAG2,256)=256

Other implementation features can include SQL command-line parameters readable by the optimizer for performing one-time overrides of the current system parameter configuration. One such command-line construct is the hint provided by Oracle. A user-supplied statement-level hint properly recognized by an Oracle optimizer can, for example, come as the following:

SELECT/*+CURSOR_SHARING_EXACT*/*FROM EMP_T. DEPT_T WHERE
(EMP_T.EMPLOYEE_ID<100) AND
(EMP_T.ENAME=DEPT_T.ENAME)

In one embodiment, a pair of similar statements is considered non-shareable if sharing a cursor compiled for one of the statements would produce incorrect results if shared by the other. For example, the third pair of similar statements of TABLE 1 are non-shareable because their differing literal values occur within an ORDER BY clause; reuse by statement 5 of an execution plan compiled for statement 6 could produce an incorrect result. To circumvent erroneous results caused by inappropriate cursor reuse, statements like these that differ by a literal in an ORDER BY clause are flagged as non-shareable so that the systems and methods for sharing of execution plans will not permit execution plan sharing in this case. In one embodiment, the systems and methods for sharing of execution plans prevent inappropriate cursor sharing by maintaining a list of SQL clauses for which cursor sharing is forbidden. Cursor sharing between the second pair of statements in TABLE 1, by contrast, would produce at least correct results for both statements despite a potential performance penalty. Non-shareable statements do not share a cursor unless the complete syntax of the statements is textually identical.

Figure 4:
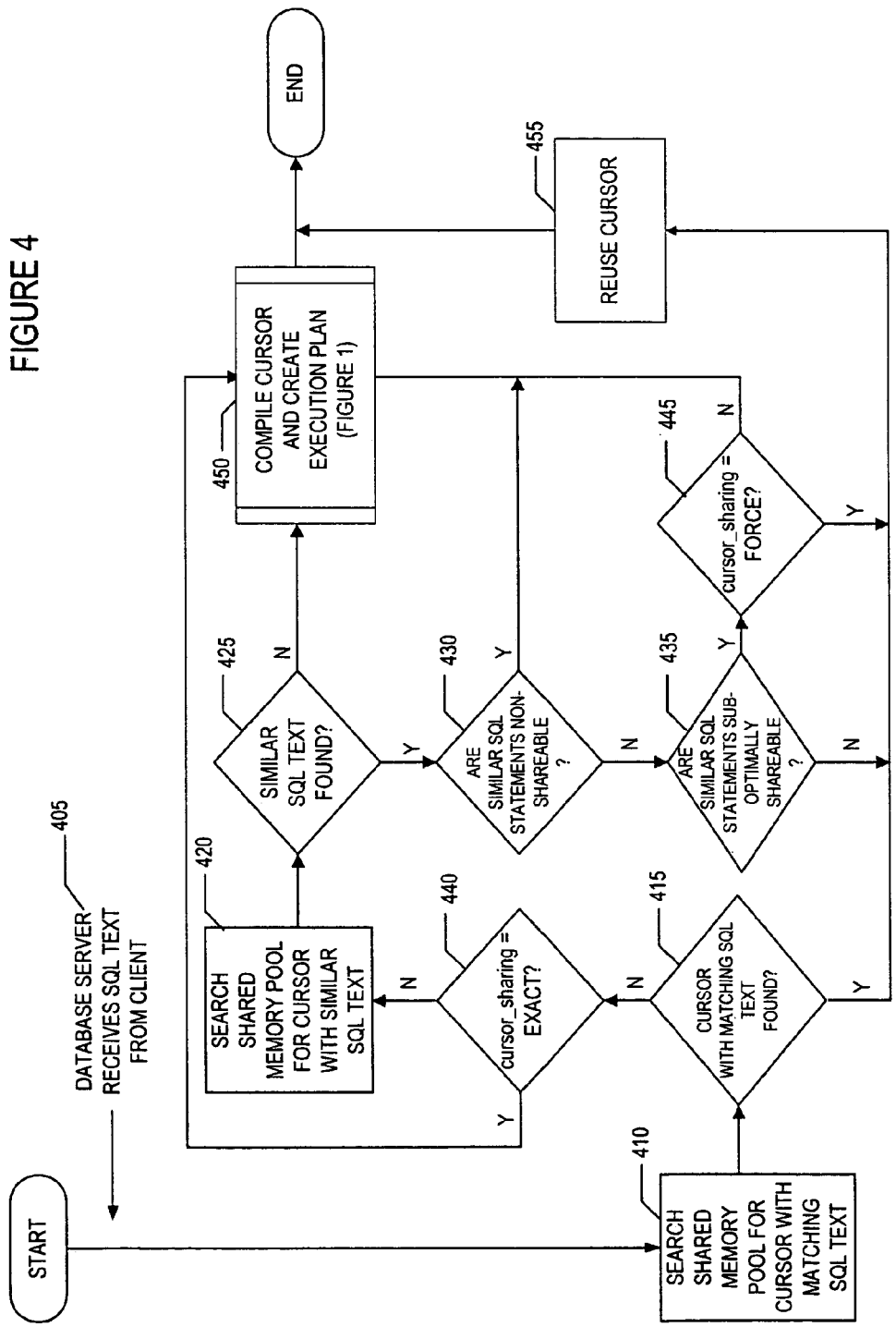
FIG. 4 is a flow diagram representing an example process for sharing of execution plans according to one embodiment.

FIG. 4 is a user-level system flow diagram exemplifying the steps of the systems and methods for sharing of execution plans for similar SQL statements according to one embodiment. The process begins when the database server receives a SQL text from a database client in step 405, for instance, as an ad-hoc query or as a DDL (data definition language) or DML request bundled within an OLTP (on-line transaction processing) application. In step 410 the server searches the shared system cache for an existing cursor compiled from matching SQL text. The shared system cache can be, for example, the shared SQL area of the Oracle shared pool. If an exact match is found, step 415, then the matching cursor is executed in lieu of compiling a cursor from scratch for the SQL text. If cursor_sharing=EXACT, step 440, then a cursor will be compiled from scratch for the SQL text (450) even though the statements might only differ by one or more literal values. In step 420, the server searches the system cache (shared pool) for a cursor compiled from similar SQL text. Two SQL texts are similar if they differ only by a literal. If a statement compiled from similar SQL text is not found, step 425, then a cursor will be compiled from scratch for that statement (step 450). If a similar statement is found in step 425, then processing continues with decision block 430.

In decision block 430, the systems and methods for execution plan sharing first analyze whether the SQL text of the two similar statements is non-shareable. For example, if the two SQL texts are identical in all but the literals contained in an ORDER BY clause, then the statements are considered non-shareable and the systems and methods for execution plan sharing will not allow the cursor found in step 425 to be shared. A new cursor for the SQL text will then be compiled (450). Only if the two statements happen to be both non-shareable and identical, would decision block 415 permit cursor sharing to take place. In order words, non-shareable SQL statements do not share an execution plan unless the statements are textually identical.

In step 435, the server determines whether the similar SQL statements are sub suboptimally shareable. If the statements are suboptimally shareable, such as the second pair of statements of TABLE 1, then if the cursor_sharing parameter is set to FORCE (445), the cursor will be executed for the SQL text. If the statements are suboptimally shareable but cursor_sharing is not set to FORCE, then a new cursor will be compiled for that SQL text (450).

In one embodiment, the systems and methods for sharing of execution plans implement reuse by automatically replacing every SQL text literal with a bind variable. A bind variable is a canonical naming scheme whereby literal SQL text is substituted on a position by position basis with a variable having the format of a text string preceded by a colon, as in the following example:

SELECT*FROM EMP_T, DEPT_T WHERE
(EMP_T.EMPLOYEE_ID<:X) AND
(EMP_T.ENAME=DEPT_T.ENAME)

Automatic bind variable substitution occurs prior to the search in the shared pool for similar SQL text in step 420, if no exact SQL text match in step 410 is found. A bind variable substituted automatically by the systems and methods for sharing of execution plans is called an internal bind variable-distinguishable from user-coded bind variables. Despite the difference in terminology, system behavior is the same with respect to user bind variables and internal bind variables alike. Finally, automatic bind variable substitution is unconditional, and occurs whether a bind variable is replacing a safe or unsafe literal, terms which are defined and described below.

Bind variables in general promote greater cursor reuse and reduce contention on the shared memory pool. A savvy developer will write his or her applications with this in mind, making use of bind variables wherever feasible. However, not all developers use bind variables consistently; as a result SQL processing can run suboptimally. The work-around for many DBAs is often to hire an consultant to either rewrite the code at considerable expense to the organization or to attempt performance fine-tuning by modifying select server parameters that may or may not directly effect SQL processing. The systems and methods for sharing of execution plans offer direct solution to optimizing SQL performance by providing a parameter whose advantages include promoting execution plan reuse without any code rework. Specifically, the systems and methods for sharing of execution plans have as an objective the improvement of SQL processing performance for applications that do not use bind variables or use them inconsistently.

An improvement offered by the methods and systems for sharing of execution plans is a forced, or automatic replacement of each literal with a bind variable. Prior methods and systems relied on the user or application developer to undertake variable substitution as a remedial performance boost—substitution did not happen automatically. In other words, the user took responsibility for poor SQL processing performance, not the server. Alternatively, to avoid a costly rewrite, a user or DBA faced with a SQL processing problem awaited the next version of the application after the developer built and distributed a new release.

According to one embodiment, if the system encounters a user-coded bind variable in a SQL text during automatic bind variable substitution, the system will ignore the variable completely; user-supplied bind variables go unacknowledged and unmodified. The classification of a literal as either safe or unsafe does, however, affect the manner of bind variable substitution. The designation of a literal as either safe or unsafe in this implementation parallels the distinction made between optimally shareable and suboptimally shareable SQL statements discussed earlier. A safe literal is one where substitution by another literal in the SQL statement where that literal resides would produce a new SQL statement having the same execution plan as before the substitution. If not the case above, the literal will be classified as unsafe. Thus, a suboptimally shareable SQL statement can also be characterized as one which differs by an unsafe literal from another similar SQL statement. Even for those SQL statements differing, for example, only by literals in an ORDER BY clause, bind variable substitution takes place. Such literals act more like keyword references to other parts or expressions of the SQL statement rather than to data values; hence, these literals are termed non-data literals. Nevertheless, as an implementation detail, the systems and methods for sharing of execution plans performs strictly unconditional bind variable substitution in this implementation. That is, bind variable substitution proceeds in this implementation without regard to the safe, unsafe, or non-data status of the SQL text literals.

Figure 5:
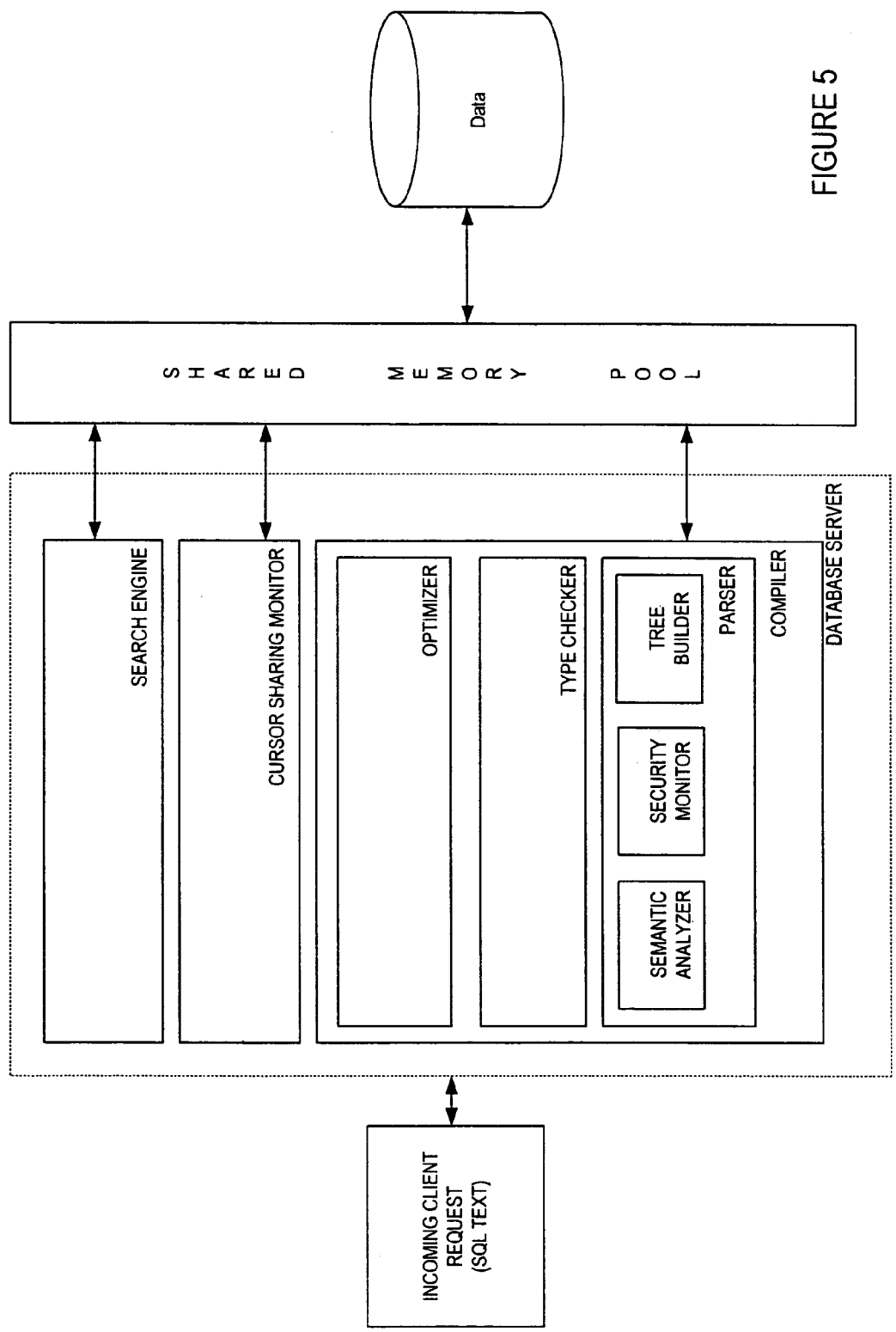
FIG. 5 is a block diagram representing an example system for sharing of execution plans according to one embodiment.

FIG. 5 is a block diagram of the components comprising the systems and methods for sharing of execution plans and showing the structural elements of the invention according to one embodiment. The database server comprises a compiler, a cursor sharing monitor, and a search engine, each of which interact with the shared memory pool. The shared memory pool is the portion of system cache where open cursors are manipulated during SQL processing. The shared memory pool can be, for example, the database shared pool area.

The database server responds to incoming client requests in the form of SQL statements and controls cooperative interaction among the database server modules. The search engine module manages the functionality of blocks 410 and 420 of FIG. 4 by checking the shared memory pool for both matching SQL text and similar SQL text, verifying the results, and interacting with the cursor sharing monitor and the compiler to further facilitate SQL processing.

The cursor sharing monitor is invoked any time execution plans are to be shared among SQL texts. For instance, if block 410 determines there to be a matching SQL text in the shared memory pool, then execution plan reuse is monitored and controlled, step 455, by the cursor sharing monitor.

By contrast, the compiler is invoked whenever execution plans are not to be shared among SQL texts. In other words, one compiler responsibility is the hard parse compilation process disclosed in FIG. 1. An example of a situation where cursor sharing is forbidden is when the system encounters two non-shareable statements, as in condition block 430. If a similar SQL text would return incorrect results under shared execution, then a cursor will be freshly compiled and run for that particular SQL text, step 450.

Figure 6:
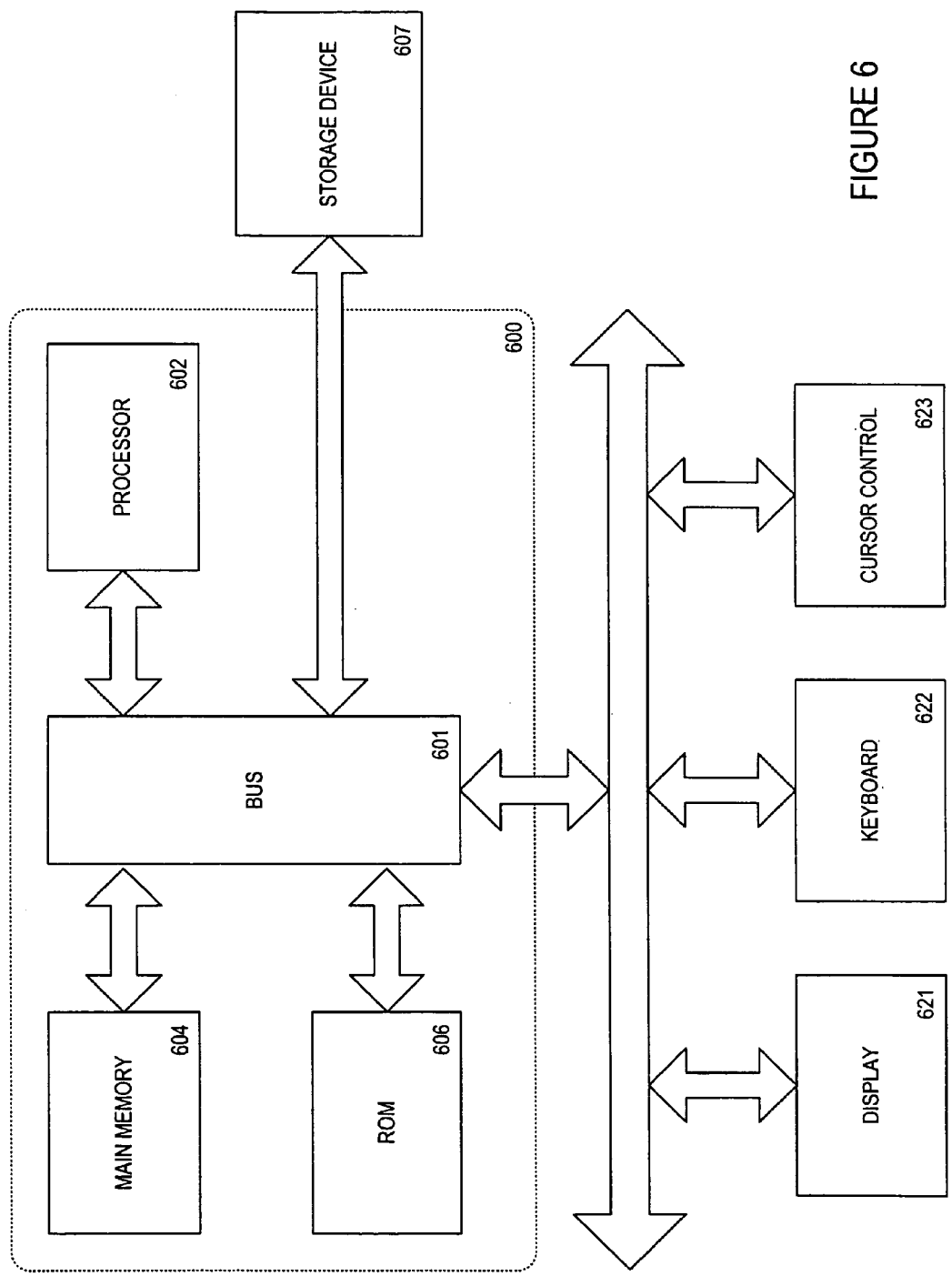
FIG. 6 is a block diagram of a computer system that can be used in the implementation of one embodiment of the systems and methods for sharing of execution plans for similar SQL statements.

FIG. 6 is a block diagram of a computer system 600 upon which the systems and methods for sharing of execution plans for similar SQL statements can be implemented. Computer system 600 includes a bus 601 or other communication mechanism for communicating information, and a processor 602 coupled with bus 601 for processing information. Computer system 600 further comprises a random access memory (RAM) or other dynamic storage device 604 (referred to as main memory), coupled to bus 601 for storing information and instructions to be executed by processor 602. Main memory 604 can also be used for storing temporary variables or other intermediate information during execution of instructions by processor 602. Computer system 600 also comprises a read only memory (ROM) and/or other static storage device 606 coupled to bus 601 for storing static information and instructions for processor 602. Data storage device 607, for storing information and instructions, is connected to bus 601.

A data storage device 607 such as a magnetic disk or optical disk and its corresponding disk drive can be coupled to computer system 600. Computer system 600 can also be coupled via bus 601 to a display device 621, such as a cathode ray tube (CRT), for displaying information to a computer user. Computer system 600 can further include a keyboard 622 and a pointer control 623, such as a mouse.

Figure 7:
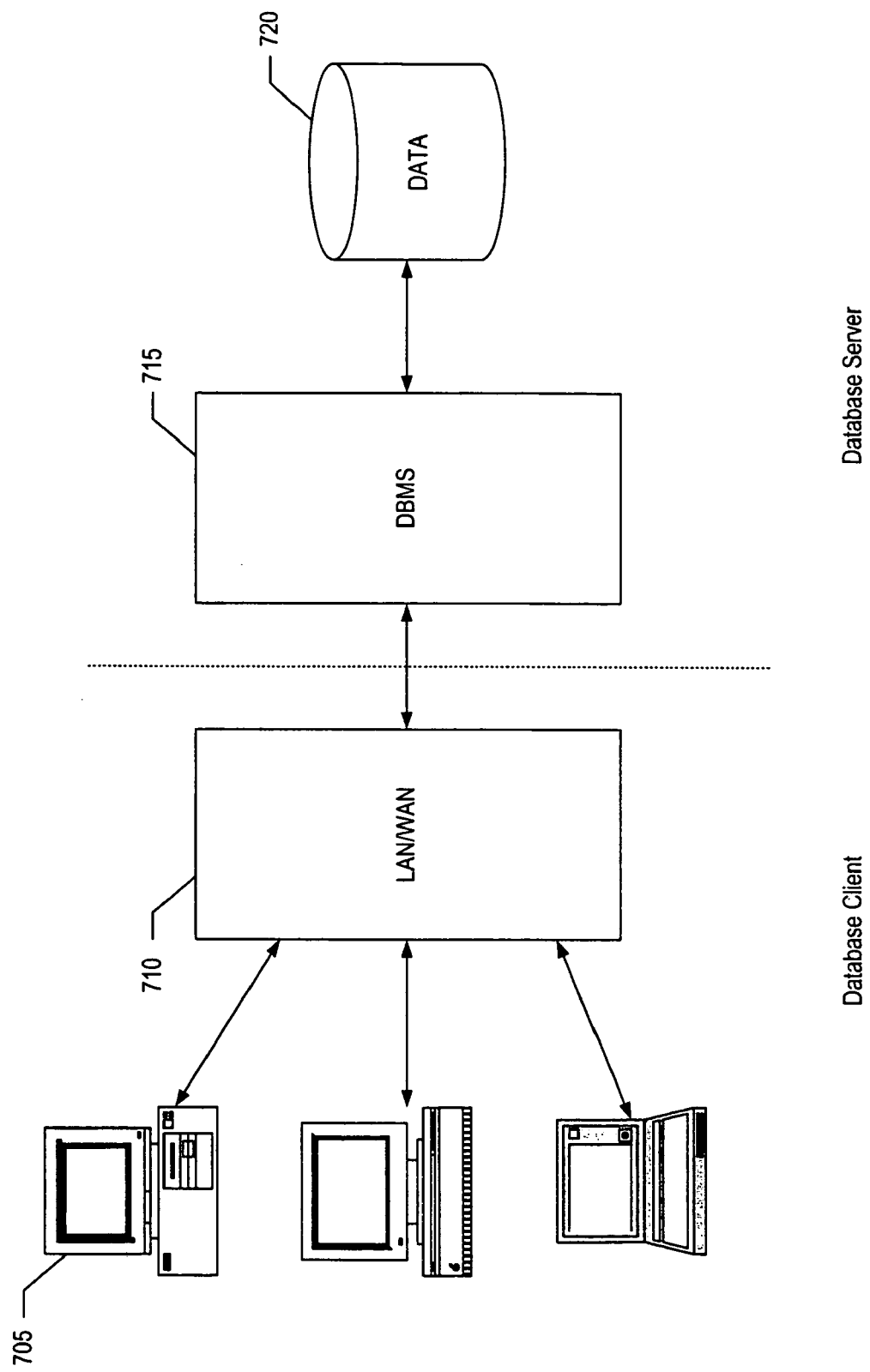
FIG. 7 is a block diagram of a two-tier client/server system that can be used to implement the systems and methods for sharing of execution plans for similar SQL statements according to one embodiment.

The systems and methods for sharing of execution plans for similar SQL statements can be deployed on computer system 600 in a stand-alone environment or in a client/server network having multiple computer systems 600 connected over a local area network (LAN) or a wide area network (WAN). FIG. 7 is a simplified block diagram of a two-tiered client/server system upon which the systems and methods for sharing of execution plans for similar SQL statements can be deployed. Each of client computer systems 705 can be connected to the database server via connectivity infrastructure that employs one or more LAN standard network protocols (i.e., Ethernet, FDDI, IEEE 802.11) and/or one or more public or private WAN standard networks (i.e., Frame Relay, ATM, DSL, T1) to connect to a database server running DBMS 715 against data store 720. DBMS 715 can be, for example, an Oracle RDBMS such as ORACLE 9i. Data store 720 can be, for example any data store or warehouse that is supported by DBMS 715. The systems and methods for sharing of execution plans for similar SQL statements are scalable to any size, from simple stand-alone operations to distributed, enterprise-wide multi-terabyte applications.

In one embodiment the system and methods for sharing of execution plans for similar SQL statements is performed by computer system 600 in response to processor 602 executing sequences of instructions contained in memory 604. Such instructions can be read into memory 604 from another computer-readable medium, such as data storage device 607. Execution of the sequences of instructions contained in memory 604 causes processor 602 to perform the process steps that will be described hereinafter. In alternative embodiments, hard-wired circuitry can be used in place of or in combination with software instructions to implement the present invention. Thus, the methods and system for sharing of execution plans for similar SQL statements is not limited to any specific combination of hardware circuitry and software.

The systems and methods for sharing of execution plans facilitate greater user control over execution plan reuse than earlier systems and methods permitted. Furthermore, by implementing the systems and methods for sharing of execution plans as a user-programmable server parameter, the user is able to control cursor reuse without rewriting application code. In an embodiment whereby SQL text literals are replaced with internal bind variables, there is no noticeable impact on system performance vis-à-vis the performance had the SQL text been originally written with user bind variables.

The systems and methods for sharing of execution plans for similar SQL statements derive many other important benefits. For one, forcing cursor sharing can significantly improve performance especially in situations where the application can tolerate suboptimal plans or as in an OLTP environment where suboptimal plans are not generally at issue on account of heavy reliance on indexes. Second, the anticipated increase in the number of parses (i.e., searches of memory for a matching SQL text) is offset by a decrease in hard parses performed (i.e., virgin compiles), greatly boosting performance in certain applications written with inconsistent use of bind variables. Third, measurable improvements in relative performance attributes, such as cycle time, memory usage, and latch contention make the systems and methods for sharing of execution plans desirable solutions having few, if any, side effects. Finally, for applications written at the outset using bind variables, the systems and methods for sharing of execution plans are designed to display no noticeable performance deterioration because the pre-check for a matching cursor in the shared memory pool will prevent a soft parse altogether, as a well-tuned application deserves.

The systems and methods for sharing of execution plans can be implemented as a direct improvement over existing systems and methods for ad-hoc SQL processing, as described herein. However, the present invention contemplates as well the enhancement of other DBMS sub-systems and interfaces including, by way of example, necessary modifications to one or more proprietary procedural languages, such as Oracle PL/SQL, or code-level adjustments or add-ons to a proprietary or open-system architecture such as Java stored programs, needed to extend the functionality of the present invention.

Other such modifications to existing program code needed to fully implement the present invention can also include enhancements to the algorithms employed by the various system modules of FIG. 5. For instance, the algorithms that the optimizer follows to build execution plans often involves the calculation of predicate selectivity. As a practical matter, the optimizer will require access to the SQL statements' proposed bindings on the first invocation of the compiler—that is, the first time a SQL text is issued from a client and compiled during a session. An implementation of the present invention whereby the optimizer has no prior knowledge of the bindings may result in performance degradation (as a result of a bad plan being built) that could exacerbate, rather than overcome, the performance problem that the methods and systems of execution plan sharing set out to solve. Thus, the optimizer would ideally need to be rewritten to permit it access to the bindings in advance of substitution. This and other similar code modifications may be necessary to a successful implementation and it is fully within the contemplation of the present invention that such modified or additional code be developed.

What is claimed is:

1. A computer implemented method for reusing a data structure in which a compiled cursor is stored, comprising:
   receiving a database statement from a client;
   analyzing the database statement;
   determining if the database statement is optimally shareable, sub-optimally shareable or non-shareable based on the analysis;
   searching server memory for a similar database statement; and
   reusing the data structure compiled for the similar database statement to execute the database statement when a system parameter that is configurable to control data structure sharing is configured to enable data structure sharing for all shareable database statements.

2. The method of claim 1, wherein reusing said data structure compiled for said similar database statement occurs when a command-line parameter is configured to control data structure sharing.

3. The method of claim 2, wherein the command-line parameter is a hint for enabling a one-time system parameter override.

4. The method of claim 1, further comprising:
   replacing all literals in said database statement with bind variables prior to said step of searching memory for said similar database statement.

5. The method of claim 1, further comprising returning a result set to the client if said database statement is a query.

6. The method of claim 1, wherein reusing said data structure includes executing the execution plan compiled from said similar database statement.

7. The method of claim 1, wherein analyzing the database statement comprising analyzing one or more of the group of: a position of a literal, a value of the literal, a number of rows in a table, and the type of database statement.

8. A computer implemented method for reusing a data structure in which a compiled cursor is stored, comprising:
   receiving a database statement from a client;
   analyzing the database statement;
   determining if the database statement is optimally shareable, sub-optimally shareable or non-shareable based on the analysis;
   searching server memory for a similar database statement; and
   reusing the data structure compiled for the similar database statement to execute the database statement when a system parameter that is configurable to control data structure sharing is configured to enable data structure sharing only for optimally shareable database statements.

9. The method of claim 8, wherein reusing said data structure compiled for said similar database statement occurs when a command-line parameter is configured to control data structure sharing.

10. The method of claim 9, wherein the command-line parameter is a hint for enabling a one-time system parameter override.

11. The method of claim 8, further comprising:
   replacing all literals in said database statement with bind variables prior to said step of searching memory for said similar database statement.

12. The method of claim 8, further comprising returning a result set to the client if said database statement is a query.

13. The method of claim 8, wherein reusing said data structure includes executing the execution plan compiled from said similar database statement.

14. The method of claim 8, wherein analyzing the database statement comprising analyzing one or more of the group of: a position of a literal, a value of the literal, a number of rows in a table, and the type of database statement.

15. A computer implemented method for reusing a data structure in which a compiled cursor is stored, comprising:
   receiving a database statement from a client;
   analyzing the database statement;
   determining if the database statement is optimally shareable, sub-optimally shareable or non-shareable based on the analysis;
   searching server memory for an exact matching database statement if the statement is non-shareable; and
   executing the data structure compiled from said exact matching database statement if said exact matching database is found in said memory.

16. The method of claim 15, wherein reusing said data structure compiled for said similar database statement occurs when a command-line parameter is configured to control data structure sharing.

17. The method of claim 16, wherein the command-line parameter is a hint for enabling a one-time system parameter override.

18. The method of claim 15, further comprising:
replacing all literals in said database statement with bind variables prior to said step of searching memory for said similar database statement.

19. The method of claim 15, further comprising returning a result set to the client if said database statement is a query.

20. The method of claim 15, wherein reusing said data structure includes executing the execution plan compiled from said similar database statement.

21. The method of claim 15, wherein said data structure comprises a cursor.

22. A computer implemented system for sharing a data structure in which a compiled cursor is stored, comprising:
a server configured to accept a database statement from a client, analyze the database statement, and to determine if the database statement is optimally shareable, sub-optimally shareable, or non-shareable based on the analysis;
a search engine for searching shared memory for a similar database statement: and
a cursor sharing monitor for executing a data structure compiled for said similar database statement if the value of a system parameter is configured to enable data structure sharing, wherein the cursor sharing monitor reuses an execution plan of the data structure compiled for the similar database statement to execute the database statement only if the system parameter is configured to enable data structure sharing for all shareable database statements.

23. The system of claim 22, further comprising a compiler for hard parsing said database statement.

24. The system of claim 23, wherein the compiler hard parses the database statement only if (1) the value of said system parameter is not configured to force data structure sharing and said database statement and said similar database statement are sub-optimally similar, or (2) if said system parameter is configured for data structure sharing only if said database statement exactly matches said similar database statement and said database statement is optimally shareable with said similar database statement, or (3) said database statement is non-shareable with said similar database statement.

25. The system of claim 24, wherein the compiler further comprises a typechecker for resolving data type conflicts between the server and the client.

26. The system of claim 24, wherein the compiler further comprises a parser for hard parsing the database statement.

27. The system of claim 26, wherein the parser further comprises a tree builder for building an expression tree from the database statement.

28. The system of claim 26, wherein the parser further comprises a semantic analyzer for verifying user permissions and access privileges for one or more objects referenced in the database statement.

29. The system of claim 24, wherein the parser further comprises a syntactic analyzer for checking the syntax of the database statement.

30. The system of claim 23, wherein the compiler further comprises an optimizer for creating an optimal execution plan for carrying out the database statement from the client.

31. A computer implemented system for sharing a data structure in which a compiled cursor is stored, comprising:
a server configured to accept a database statement from a client, analyze the database statement, and to determine if the database statement is optimally shareable, sub-optimally shareable, or non-shareable based on the analysis;
a search engine for searching shared memory for a similar database statement: and
a cursor sharing monitor for executing a data structure compiled for said similar database statement if the value of a system parameter is configured to enable data structure sharing, wherein the cursor sharing monitor reuses an execution plan of the data structure compiled for the similar database statement to execute the database statement only if the system parameter is configured to enable data structure sharing for all optimally shareable database statements.

32. The system of claim 31, further comprising a compiler for hard parsing said database statement.

33. The system of claim 32, wherein the compiler hard parses the database statement only if (1) the value of said system parameter is not configured to force data structure sharing and said database statement and said similar database statement are sub-optimally similar, or (2) if said system parameter is configured for data structure sharing only if said database statement exactly matches said similar database statement and said database statement is optimally shareable with said similar database statement, or (3) said database statement is non-shareable with said similar database statement.

34. The system of claim 33, wherein the compiler further comprises a typechecker for resolving data type conflicts between the server and the client.

35. The system of claim 33, wherein the compiler further comprises a parser for hard parsing the database statement.

36. The system of claim 35, wherein the parser further comprises a tree builder for building an expression tree from the database statement.

37. The system of claim 35, wherein the parser further comprises a semantic analyzer for verifying user permissions and access privileges for one or more objects referenced in the database statement.

38. The system of claim 33, wherein the parser further comprises a syntactic analyzer for checking the syntax of the database statement.

39. The system of claim 32, wherein the compiler further comprises an optimizer for creating an optimal execution plan for carrying out the database statement from the client.

40. A computer program product embodied on computer readable medium, the computer readable medium having stored thereon a sequence of instructions which, when executed by a processor, causes the processor to execute a method for reusing a data structure in which a compiled cursor is stored, the method comprising:
receiving a database statement from a client;
analyzing the database statement;
determining if the database statement is optimally shareable, sub-optimally shareable, or non-shareable based on the analysis;
searching server memory for a similar database statement; and
reusing the data structure compiled for the similar database statement to execute the database statement when a system parameter that is configurable to control data structure sharing is configured to enable data structure sharing for all shareable database statements.

41. The computer program product of claim 40, wherein reusing said data structure compiled for said similar database statement occurs when a command-line parameter is configured to control data structure sharing.

42. The computer program product of claim 41, wherein the command-line parameter is a hint for enabling a one-time system parameter override.

43. The computer program product of claim 40, further comprising:
replacing all literals in said database statement with bind variables prior to said step of searching memory for said similar database statement.

44. The computer program product of claim 40, further comprising returning a result set to the client if said database statement is a query.

45. The computer program product of claim 40, wherein reusing said data structure includes executing the execution plan compiled from said similar database statement.

46. The computer program product of claim 40, wherein analyzing the database statement comprising analyzing one or more of the group of: a position of a literal, a value of the literal, a number of rows in a table, and the type of database statement.

47. A computer program product embodied on computer readable medium, the computer readable medium having stored thereon a sequence of instructions which, when executed by a processor, causes the processor to execute a method for reusing a data structure in which a compiled cursor is stored, the method comprising:
receiving a database statement from a client;
analyzing the database statement;
determining if the database statement is optimally shareable, sub-optimally shareable, or non-shareable based on the analysis;
searching server memory for a similar database statement; and
reusing the data structure compiled for the similar database statement to execute the database statement when a system parameter that is configurable to control data structure sharing is configured to enable data structure sharing only for optimally shareable database statements.

48. The computer program product of claim 47, wherein reusing said data structure compiled for said similar database statement occurs when a command-line parameter is configured to control data structure sharing.

49. The computer program product of claim 48, wherein the command-line parameter is a hint for enabling a one-time system parameter override.

50. The computer program product of claim 47, further comprising:
replacing all literals in said database statement with bind variables prior to said step of searching memory for said similar database statement.

51. The computer program product of claim 47, further comprising returning a result set to the client if said database statement is a query.

52. The computer program product of claim 47, wherein reusing said data structure includes executing the execution plan compiled from said similar database statement.

53. The computer program product of claim 47, wherein analyzing the database statement comprising analyzing one or more of the group of: a position of a literal, a value of the literal, a number of rows in a table, and the type of database statement.

54. A computer program product embodied on computer readable medium, the computer readable medium having stored thereon a sequence of instructions which, when executed by a processor, causes the processor to execute a method for reusing a data structure in which a compiled cursor is stored, the method comprising:
receiving a database statement from a client;
analyzing the database statement;
determining if the database statement is optimally shareable, sub-optimally shareable, or non-shareable based on the analysis;
searching server memory for an exact matching database statement if the statement is non-shareable; and
executing the data structure compiled from said exact matching database statement if said exact matching database statement is found in said memory.

55. The computer program product of claim 54, wherein reusing said data structure compiled for said similar database statement occurs when a command-line parameter is configured to control data structure sharing.

56. The computer program product of claim 55, wherein the command-line parameter is a hint for enabling a one-time system parameter override.

57. The computer program product of claim 54, further comprising:
replacing all literals in said database statement with bind variables prior to said step of searching memory for said similar database statement.

58. The computer program product of claim 54, further comprising returning a result set to the client if said database statement is a query.

59. The computer program product of claim 54, wherein reusing said data structure includes executing the execution plan compiled from said similar database statement.

60. The computer program product of claim 54, wherein analyzing the database statement comprising analyzing one or more of the group of: a position of a literal, a value of the literal, a number of rows in a table, and the type of database statement.

* * * * *